US012296961B2

(12) United States Patent
Newbold

(10) Patent No.: US 12,296,961 B2
(45) Date of Patent: May 13, 2025

(54) IMBEDDED SENSORS FOR PASSENGER SEATS

(71) Applicant: Safran Seats USA LLC, Gainesville, TX (US)

(72) Inventor: Tyler L. Newbold, Sherman, TX (US)

(73) Assignee: Safran Seats USA LLC, Gainesville, TX (US)

( * ) Notice: Subject to any disclaimer, the term of this patent is extended or adjusted under 35 U.S.C. 154(b) by 469 days.

(21) Appl. No.: 17/442,044

(22) PCT Filed: Apr. 1, 2019

(86) PCT No.: PCT/US2019/025173
§ 371 (c)(1),
(2) Date: Sep. 22, 2021

(87) PCT Pub. No.: WO2020/197567
PCT Pub. Date: Oct. 1, 2020

(65) Prior Publication Data
US 2022/0177139 A1 Jun. 9, 2022

Related U.S. Application Data

(60) Provisional application No. 62/823,196, filed on Mar. 25, 2019.

(51) Int. Cl.
*B64D 11/06* (2006.01)
*B60N 2/00* (2006.01)
(Continued)

(52) U.S. Cl.
CPC .......... *B64D 11/0624* (2014.12); *B60N 2/002* (2013.01); *B60N 2/0033* (2023.08);
(Continued)

(58) Field of Classification Search
CPC ............ B64D 11/0624; B64D 11/0638; B64D 11/064; B64D 11/0647; B60N 2/0272; B60N 2/002; B60N 2/7005
See application file for complete search history.

(56) References Cited

U.S. PATENT DOCUMENTS 4,909,560 A * 3/1990 Ginn ........................ B60N 2/06
297/344.13
5,810,392 A 9/1998 Gagnon
(Continued)

FOREIGN PATENT DOCUMENTS

DE 102006039504 A1 2/2008
EP 3061465 A1 8/2016
(Continued)

OTHER PUBLICATIONS

International Patent Application No. PCT/US2019/025173, International Search Report and Written Opinion, dated Dec. 5, 2019.
(Continued)

*Primary Examiner* — David R Dunn
*Assistant Examiner* — Christopher E Veraa
(74) *Attorney, Agent, or Firm* — Kilpatrick Townsend & Stockton LLP

(57) ABSTRACT

Described are passenger seat assemblies having a first seat structure (222) that includes a non-contact sensor or sensors (106a) and a second, movable or deployable passenger seat structure (226) that contains an embedded magnetic element or elements (236a). Each magnetic element interacts with the non-contact sensor such that the embedded magnetic element causes the non-contact sensor (106a) to switch between a first state and the second state, depending on the orientation of the second structure (226) with respect to the first structure (222). The sensor can detect whether the
(Continued)

second passenger seat structure is positioned in a stowed configuration or a deployed configuration.

19 Claims, 7 Drawing Sheets

(51) Int. Cl.
*B60N 2/02* (2006.01)
*B60N 2/10* (2006.01)
*B60N 2/70* (2006.01)

(52) U.S. Cl.
CPC ......... *B60N 2/0272* (2023.08); *B60N 2/7005* (2013.01); *B64D 11/0638* (2014.12); *B64D 11/064* (2014.12); *B64D 11/0647* (2014.12)

(56) References Cited

U.S. PATENT DOCUMENTS

| | | | |
|---|---|---|---|
| 5,990,799 | A | 11/1999 | Boon et al. |
| 6,929,218 | B1 | 8/2005 | Sanford et al. |
| 8,496,291 | B2 | 7/2013 | Lamoree et al. |
| 11,491,895 | B2 | 11/2022 | Mizoi et al. |
| 11,541,785 | B2 | 1/2023 | Sugiyama et al. |
| 2002/0190874 | A1* | 12/2002 | Tokunaga ............... B60N 2/002 341/15 |
| 2003/0080734 | A1* | 5/2003 | Hedayat ................... B60N 2/06 74/609 |
| 2003/0169033 | A1* | 9/2003 | Tromblee ............... G01D 5/147 324/207.2 |
| 2004/0004474 | A1* | 1/2004 | Kojima .................... B60N 2/06 324/207.24 |
| 2004/0195875 | A1 | 10/2004 | Skelly |
| 2004/0251723 | A1* | 12/2004 | Endo .................... B60N 2/0715 297/284.3 |
| 2009/0079248 | A1* | 3/2009 | Keyser ................. B60N 2/2213 297/362.11 |
| 2009/0243868 | A1 | 10/2009 | Wentland et al. |
| 2010/0219813 | A1* | 9/2010 | Ito ....................... B60N 2/02246 324/207.22 |
| 2011/0043010 | A1* | 2/2011 | Diemer ..................... B60N 2/07 297/217.3 |
| 2011/0089737 | A1* | 4/2011 | Tscherbner ............ B60N 2/812 297/391 |
| 2011/0148173 | A1* | 6/2011 | Westerink .............. B64D 11/06 297/452.18 |
| 2012/0217779 | A1* | 8/2012 | Gaither ................ B64D 11/064 297/316 |
| 2012/0226418 | A1* | 9/2012 | Veen ..................... B60W 50/16 297/217.3 |
| 2016/0001683 | A1* | 1/2016 | Bohlke .................. B60N 2/797 297/378.1 |
| 2016/0031560 | A1* | 2/2016 | Zheng .................. B64D 11/064 297/344.1 |
| 2016/0250362 | A1* | 9/2016 | Mackin .................. B64D 11/06 244/118.5 |
| 2019/0308579 | A1* | 10/2019 | Jouper ................... B64D 11/06 |
| 2022/0097571 | A1* | 3/2022 | Petit .......................... B60N 2/42 |
| 2022/0176850 | A1* | 6/2022 | Kulhawik ............. B60N 2/1835 |
| 2022/0198889 | A1* | 6/2022 | Meinert .................... G08B 5/36 |

FOREIGN PATENT DOCUMENTS

| | | |
|---|---|---|
| EP | 3453618 A1 | 3/2019 |
| FR | 2944485 A1 | 10/2010 |
| FR | 3058124 A1 | 5/2018 |
| GB | 2292676 A | 3/1996 |
| WO | 2013119713 A1 | 8/2013 |
| WO | 2016124840 A1 | 8/2016 |
| WO | 2018234667 A1 | 12/2018 |
| WO | 2020197568 A1 | 10/2020 |

OTHER PUBLICATIONS

U.S. Appl. No. 17/435,651, Non-Final Office Action, Oct. 16, 2023.

* cited by examiner

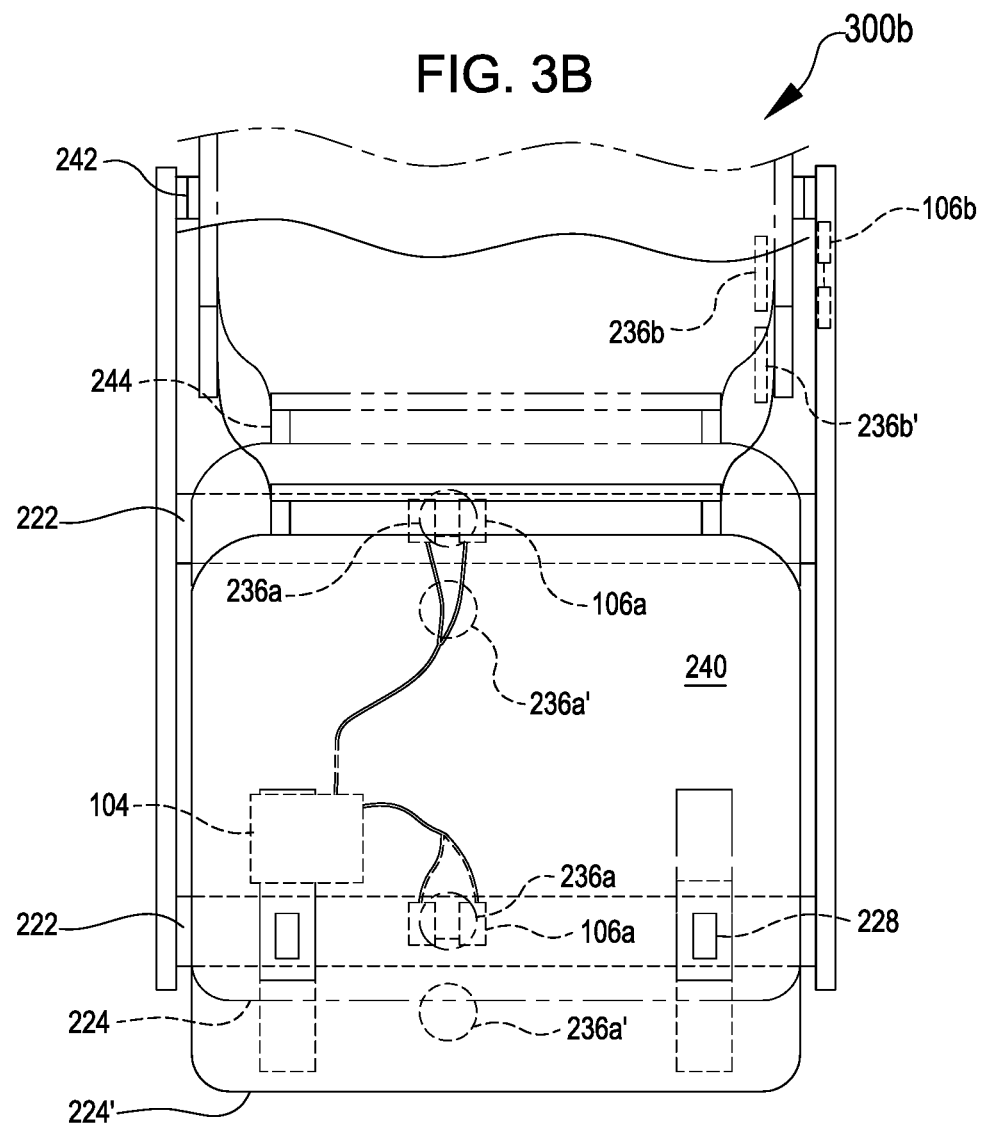

IMBEDDED SENSORS FOR PASSENGER SEATS

CROSS REFERENCE TO RELATED APPLICATIONS

This application is related to and claims priority benefits from U.S. Provisional Application Ser. No. 62/823,196 ("the '196 application"), filed on Mar. 25, 2019, entitled IMBEDDED SENSORS FOR AIRCRAFT PASSENGER SEATS. The '196 application is hereby incorporated in its entirety by this reference.

FIELD OF THE INVENTION

The field of the invention relates to passenger seats.

BACKGROUND

In commercial aircraft, seats are designed to meet the needs of passenger safety and comfort, while accounting for strict limitations on weight and space. To accommodate both safety and comfort aims, modern aircraft seats contain a variety of deployable features. Such features include, e.g., articulating support surfaces, tray tables, and the like. These various parts are generally configured to have a safely "stowed" configuration, and a comfortable or useful "deployed" configuration. For example, conventional passenger seats can normally recline, either by allowing the seat back to move relative to the seat frame, or by allowing the seat back and seat pan together to articulate relative to the seat frame. By way of another example, conventional passenger seats often include deployable tray tables or even electronic displays that can extend from an adjacent seat, armrest, or other location. However, there is a competing safety interest in ensuring and verifying that such deployable or movable parts are safely stowed. To that end, improved solutions for passenger seat safety are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly can include a first structure and a second structure that is movable connected with the first structure, e.g., a frame connected with an articulating seat pan, a frame connected with a reclinable seat back, a frame connected with an arm rest, a seat back or seat frame connected with a deployable tray table, or similar structure. The first passenger seat structure can include a non-contact sensor having a first state and a second state The second passenger seat structure can include an embedded magnetic element that interacts with the non-contact sensor in the first passenger seat structure such that the embedded magnetic element causes the non-contact sensor to switch between the first state and the second state when the second passenger seat structure is transitioned between the stowed configuration and the deployed configuration.

According to certain embodiments of the present invention, a passenger seat assembly as described above can be included in a system for detecting the status (i.e., deployed or stowed, reclined or upright) of any suitable passenger seat structure. In addition to a selection of paired sensors and magnetic elements on movable passenger seat structures, the system can include a controller comprising a processor and non-volatile memory containing instructions that, when executed by the processor, cause the controller to receive a signal from each non-contact sensor. The system can utilize the signal or signals to determine whether each non-contact sensor is in the first state or the second state, and can determine therefrom whether the passenger seat structure is stowed or deployed.

According to various embodiments, a system as described above can be used to monitor multiple and potentially many passenger seat structures across multiple and potentially many different passenger seat assembles. The system can determine, based on the signals from the various sensors connected with the passenger seat assemblies, whether any suitable number of passenger seat structures are deployed or stowed, and may generate an indication for use by a user (such as cabin crew or flight crew) indicating whether any passenger seat structures are deployed. This information may be used, e.g., for enforcement of safety policies whereby seat structures must be stowed for maneuvers.

BRIEF DESCRIPTION OF THE DRAWINGS

FIG. 3B shows a top view illustrating aspects of the passenger seating arrangement shown in FIG. 3A.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide for passenger seating arrangements having passenger seats with embedded sensors for monitoring, among other things, the orientation or stowed/deployed status of various seat components. While the improved seating arrangements and passenger seat assemblies are discussed for use with aircraft seats, they are by no means so limited. Rather, embodiments of the passenger seats and seating arrangements may be used in passenger seats or other seats of any type or otherwise as desired. In some embodiments, embedded sensors may communicate with a control system including, e.g., local and/or central controllers that can provide information to a cabin crew, engineer, or flight crew for detecting aspects of the orientations or stowed/deployed status of passenger seat elements.

Figure 1:
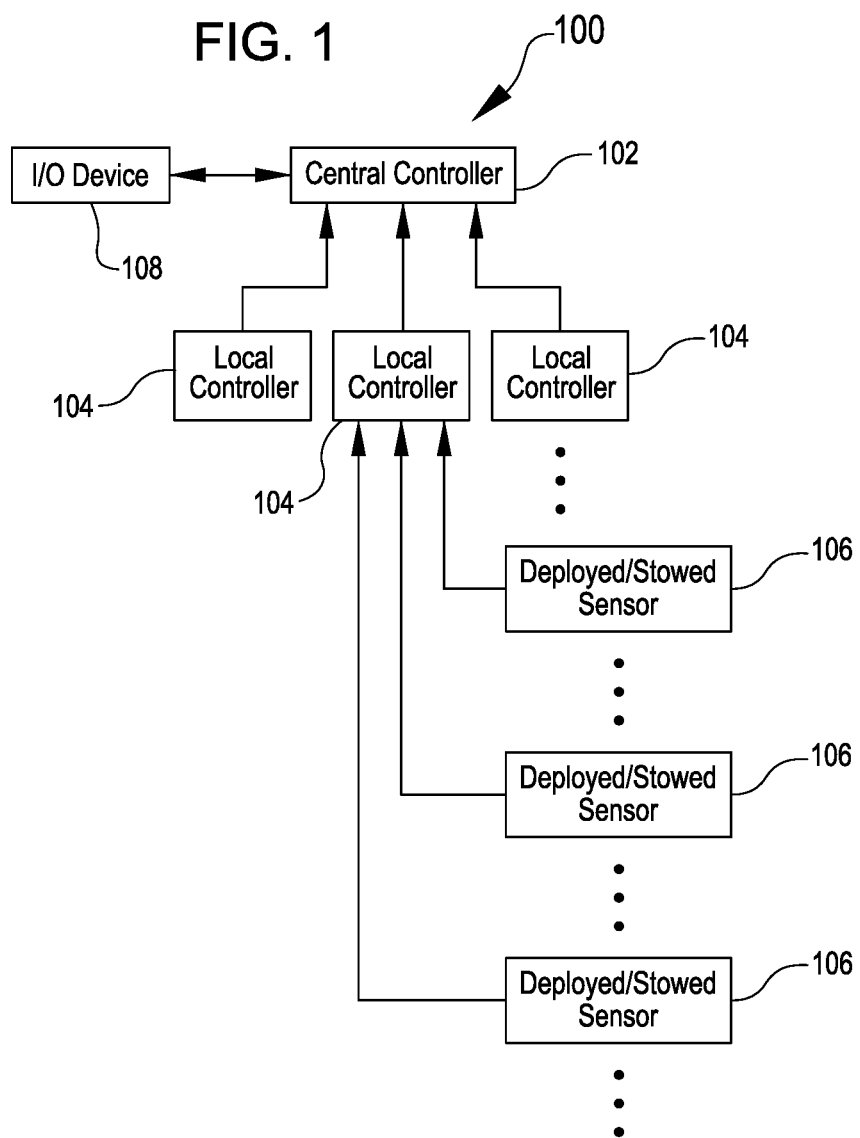
FIG. 1 is a simplified block diagram illustrating a system for monitoring passenger seat components via embedded sensors, according to various embodiments of the present disclosure.

According to certain embodiments of the present disclosure, as shown in FIG. 1, a passenger seating control system 100 can include any suitable number of sensors 106, which can be installed in elements of passenger seats for detecting the orientation or stowed/deployed status of the seating elements thereof. In one embodiment of the system 100, multiple sensors 106 (e.g., the sensors for elements of one seat, the sensors for elements of multiple adjacent seats, or other grouping of seats) may be operably or electrically connected with a local controller 104. Connections for reading data from sensors 106 can be wired, can be wireless (e.g., using RF or other wireless communication techniques), or can use a combination of wire and conductive thread or printed circuitry in the seat components.

According to some embodiments, each local controller 104 may connect with a central controller 102 in order to communicate status information to the central controller regarding readings from any number of the sensors 106. For example, the sensors 106 may include stowed/deployed sensors for detecting the status of passenger seat backs (i.e., whether fully upright or reclined) and/or tray tables (i.e., stowed or deployed) and/or any other suitable accessories that can have one configuration for takeoff, landing, and/or turbulence and a different configuration that is permitted during flight. In such embodiments, the central controller 102 may collect information from the various sensors 106 indicative of the status of passenger seat components, either directly or via any suitable number of intermediate local controllers 104, and then communicate that information to a user (e.g., cabin crew, flight crew, engineer) by way of a user input/output (TO) device 108, which might be any suitable display and/or communication device such as a computer terminal, mobile device, or similar IP device.

As noted above, the components and principles described above may apply to passenger carriers other than aircraft, e.g., trains, busses, vessels, or any other suitable passenger vehicle, without departing from the spirit of this disclosure.

Figure 2:
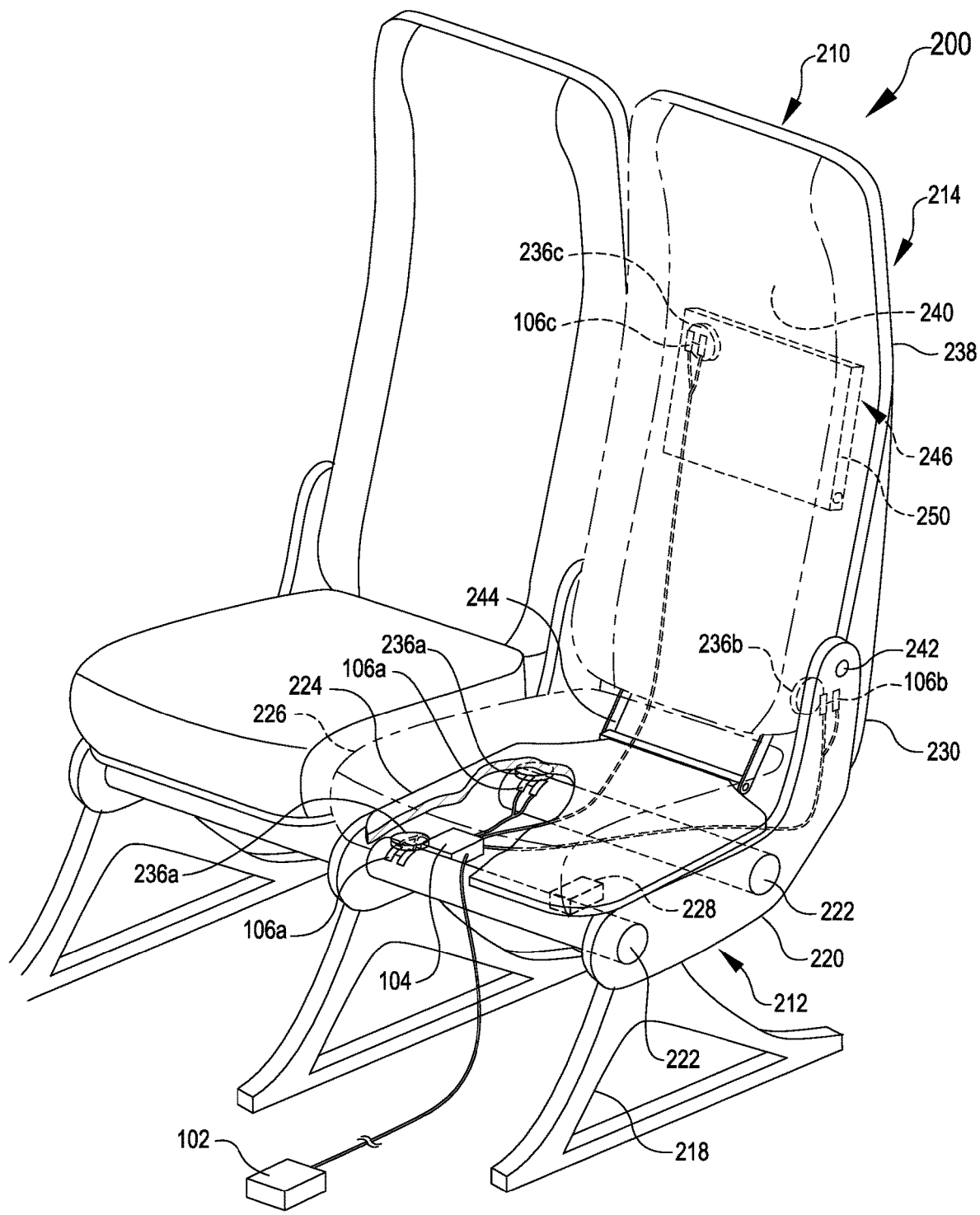
FIG. 2 is a perspective view showing an example of a seating arrangement having passenger seats with imbedded sensors, according to various embodiments of the present disclosure.

According to various embodiments, as illustrated in FIG. 2, deployed/stowed status sensors 106 may be implemented in a passenger seat arrangement 200 for detecting the status of the various aircraft seat components. The passenger seat arrangement 200 can include any suitable number of passenger seat assemblies 210. Each passenger seat assembly 210 can include a seat frame assembly 212 that supports a seat back assembly 214 and seat bottom assembly 216. According to various embodiments, the seat bottom assembly 216 and/or seat back assembly 214 may articulate in response to force exerted by a passenger, typically in conjunction with an unlocking action by the passenger that permits the seat to recline and, optionally, allows the seat bottom to move forward.

The seat frame assembly 212 can include a seat base frame 218 for connecting the passenger seat assembly 210 with the passenger cabin, and seat frame tubes 222 that support the sidewalls or seat spreaders 220 and the seat bottom pan 224. The seat bottom pan 224 and attached seat cushion 226 is the primary support for the passenger. In embodiments where the seat bottom pan 224 articulates, the seat bottom assembly 216 can include sliding assemblies 228 that allow the seat bottom pan to move forward and aft with respect to the seat frame assembly 212.

The seat back assembly 214 includes a seat back shell or frame 238 that supports a seat back cushion 240. According to various embodiments, the seat back assembly 214 can connect with the seat frame assembly 212, e.g. at seat back hinge 242, and may also connect with the seat bottom pan 224 by way of a seat back linkage 244 that connects the seat back assembly with the seat bottom assembly so that they move in concert when reclined by a passenger. In fully articulating seats, the seat back linkage 244 connects with a lower extent 230 of the seat back frame 238. In some embodiments, the seat back frame 238 may support a tray table assembly 246 that is operable to deploy a tray table 250 therefrom.

According to various embodiments, a selection of sensors 106 and embedded magnetic elements 236 may be distributed in pairs within or attached to moving components of the passenger seat assembly 210. For example, according to some embodiments, one or more seat pan sensors 106a may be connected with the seat frame assembly 212, and matching embedded magnetic elements 236a may be positioned within or attached to the seat pan assembly 216. In operation, the seat pan sensors 106a remain stationary while the seat pan assembly 216 articulates over the seat pan sensors. As the seat pan assembly 216 moves, the embedded magnetic elements 236a change position from being proximately disposed with respect to the seat pan sensors 106a, to being positioned at a remove. Although the non-contact sensors 106a do not touch the magnetic elements 236a, sufficient magnetic force is exerted by the magnetic element to change the state of the seat pan sensors 106a, so that in a first state the seat pan sensors indicate that the seat pan assembly 216 is a fully upright/stowed condition, and in a second state the seat pan sensors indicate that the seat pan assembly is shifted forward, in accordance with a reclined or deployed position.

The non-contact sensors 106a can be connected directly with, e.g., either one or with both of the seat frame tubes 222, or with any other suitable point on the seat frame assembly 212. According to some embodiments, the non-contact sensors 106a can be adhered, taped, pinned, or otherwise fastened to the seat frame assembly 212, either by permanent or removable means. According to some specific embodiments, the non-contact sensors 106a may be permanently fixed to the seat frame assembly 212, and can optionally be covered (e.g., with adhesive tape, or within a housing) so as to protect the non-contact sensor within the seat frame assembly and prevent access or disruption by a passenger.

The non-contact sensor or sensors 106a can include any suitable magnetically actuatable switch such as, but not limited to, a magnetic reed switch or a hall effect sensor. In some embodiments, the non-contact sensors 106a are activated when in proximity to a magnet, and deactivated when the magnet is removed, thus permitting the non-contact sensors 106a to inhabit an activated (first) state when in proximity to the magnet, and a deactivated (second) state when the magnet has been moved.

Magnetic elements 236a can include any suitable magnet with sufficient magnetic field to activate the non-contact sensors 106a at a predefined distance. According to various embodiments, the magnetic elements 236a can include a permanent magnet, a temporary magnet, or an assembly of an electromagnetic element and power source. Suitable permanent magnets can include, but are not limited to, neodymium, samarium cobalt, alnico, ceramic, or ferrite magnets. The magnetic elements 236 may be encased and/or embedded a structural element of the seat bottom assembly 216 such as the seat bottom pan 224, or may be encased and then fixed to an element thereof. The magnetic element or elements 236a can be positioned such that, when the seat pan assembly 216 is at rest and in the upright position, the magnetic elements are positioned above and proximate to the non-contact sensors 106a. According to various embodiments, a minimum distance between the magnetic elements 236 and an associated non-contact sensor 106 can vary depending on the strength of the magnetic element and/or the sensitivity of the non-contact sensor. In some applications, this minimum distance may be less than 10 cm, or from 0 cm to 10 cm, or preferably from about 2 cm to 4 cm.

The passenger seat assembly 210 can include additional magnetic elements and non-contact sensors suitable for detecting the status (i.e., deployed or stowed, upright or reclined) of various passenger seat elements. For example, as also shown in FIG. 2, the seat back 214 can contain, e.g. within the seat back frame 238, an additional magnetic element 236b. This additional magnetic element 236b is positioned to interact with an additional non-contact sensor 106b, positioned on or embedded within the seat spreader 220 proximate to the seat back assembly 214. When the seat back assembly 214 is fully upright, the magnetic element 236b activates the non-contact sensor 106b in an "upright" or "stowed" state; and when the seat back assembly is reclined, the magnetic element 236b moves relative to the non-contact sensor 106b and deactivates the sensor, resulting in a "reclined" or "deployed" state.

Additional non-contact sensor and magnetic element configurations are described below with reference to FIGS. 3A-5B. In general, non-contact sensors 106 can communicate information about their status to a local controller 104, which can relay information in conjunction with any suitable number of additional local controllers to a central controller 102. In some alternative embodiments, non-contact sensors 106 may communicate information wirelessly, or directly to a central controller 102.

Figure 3A:
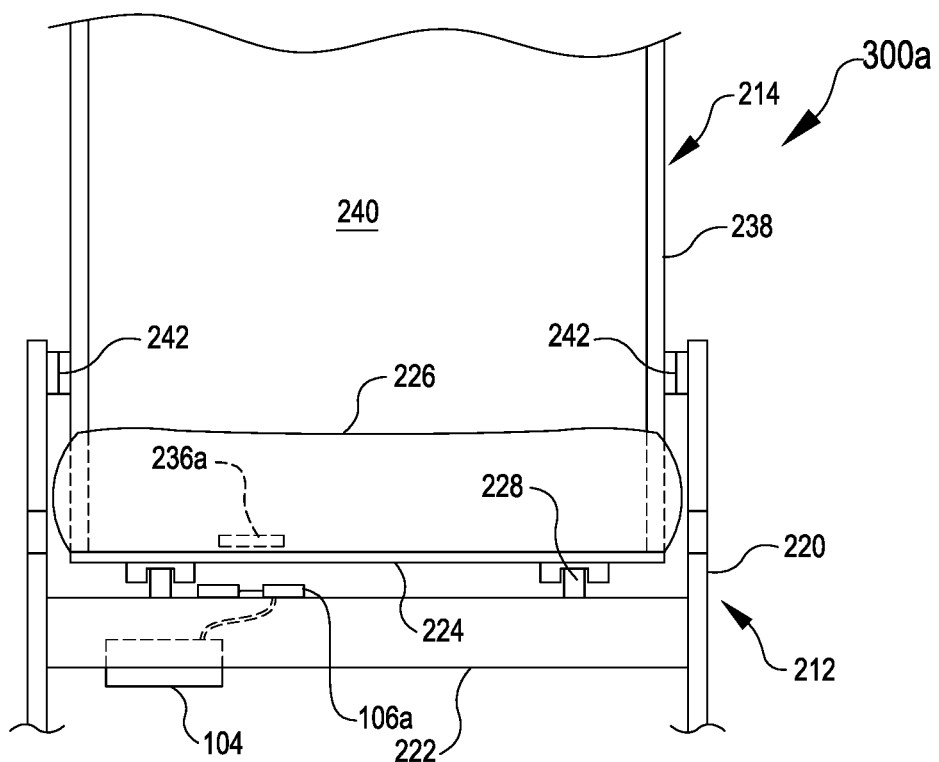
FIG. 3A shows a front view illustrating aspects of the passenger seating arrangement shown in FIG. 2.

FIG. 3A shows portions of seat assembly 210 in a front view 300a, with attention to the sensor 106a connected with the seat frame assembly 212. The seat frame assembly 212, including seat frame tubes 222 and spreaders 220, is configured to support the seat bottom pan 224 and the seat back assembly 214. For articulating embodiments, the seat bottom pan 224 is capable of sliding forward and aft with respect to the seat frame tubes 222 by way of sliding assemblies 228. The sensor 106a is connected with the seat frame assembly 212, e.g. to one or more of the seat frame tubes 222, although in alternative embodiments the sensor 106a may be connected with the seat frame assembly 212 in any fixed location.

The magnetic element 236a configured to pair with the sensor 106a is mounted to the seat pan 224, preferably embedded therein. In some embodiments, the magnetic element 236a can be connected underneath the seat pan 224, above the seat pan, or inserted into a void in the seat pan; provided the magnetic element is suspended at a location sufficiently close to interact with the sensor 106a. In some embodiments, the magnetic element 236 may be positioned below the seat bottom cushion 226. Sensor 106a may also be embedded or placed within components of the seat frame assembly 212.

The seat back assembly 214 can be connected with the seat bottom pan 224 such that the two assemblies move in concert when the passenger seat 210 is reclined by a passenger. As shown in top view 300b of FIG. 3B, the seat frame assembly 212 can additionally support seat back assembly 214 by way of seat back pivot elements 242 connected with the seat spreaders 220. The additional seat back sensor 106b may be embedded in, or connected to, seat spreader 220 where it is positioned to detect magnetic element 236b embedded in the seat back frame 238 or cushion 240.

FIG. 3B illustrates the change in configuration that corresponds to articulation of the seat bottom assembly 216 and seat back assembly 214 with respect to the seat frame 212 when the passenger seat 210 is reclined. In their initial positions, the seat bottom sensor or sensors 236a are positioned proximate to the seat bottom magnetic element or elements 236a. Likewise, seat back sensor 106b is positioned proximate the seat back magnetic element 236b.

When the passenger seat 210 reclines, the seat bottom magnetic elements 236a translate to 236a', where they are no longer detected by seat bottom sensors 106a, triggering a state change at the sensors 106a indicative of the seat bottom assembly 216 having articulated away from the upright position. Similarly, when the seat back assembly 214 reclines, seat back magnetic element 236b translates to 236b' relative to the seat back sensor 106b, triggering a state change at sensor 106b indicative of the seat back assembly having articulated away from the upright position. In various embodiments, fewer sensors may be present than those illustrated herein, as the deployed/stowed status of the passenger seat assembly 210 can be determined using a single sensor/magnet assembly. According to some alternative embodiments, such as seats that lack articulating seat pans, the status of the seat back assembly 214 can be determined based solely on a sensor/magnet assembly positioned in accordance with the alternative sensor 106b and magnetic element 236b. Any suitable number of status sensors 106 can communicate their status to a controller such as local controller 104. In some alternative embodiments, one or more of the magnetic elements 236 and sensors 106 might be positioned with respect to each other such that a magnetic element moves toward a corresponding sensor as the passenger seat 210 reclines. In embodiments having this reversed configuration, a cabin monitoring system (e.g. system 100, FIG. 1) can detect whether a passenger seat 210 is in an upright position in the absence of a signal from an associated non-contact sensor associated with the passenger seat, and detect that the passenger seat is reclined by detecting the signal caused by the magnetic element 106 interacting with the non-contact sensor 236.

Figure 4A:
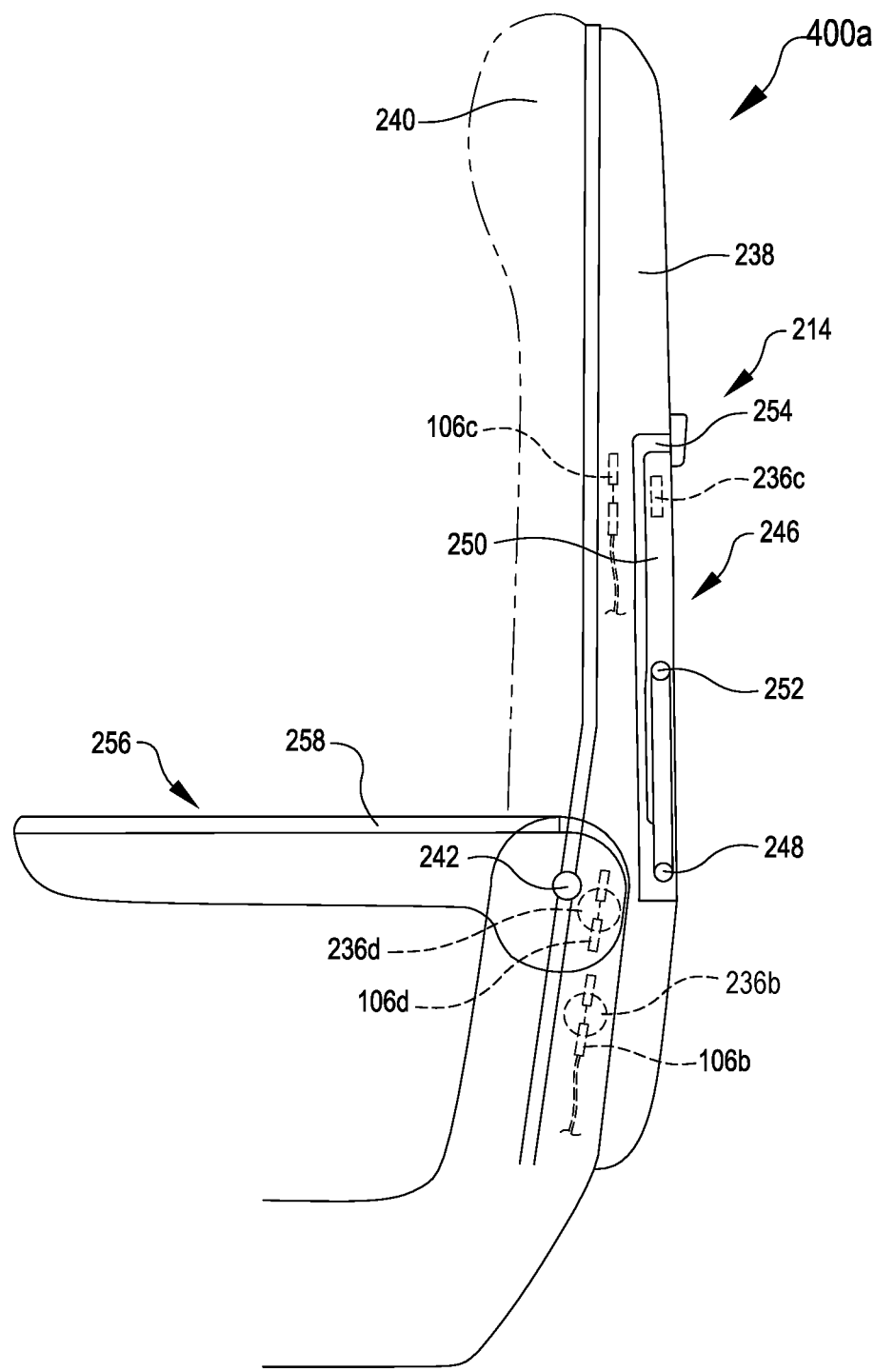
FIG. 4A shows a side view illustrating aspects of the passenger seating arrangement shown in FIG. 2 in a stowed configuration.

FIG. 4A is a first side view 400a showing aspects of the seating arrangement 200 shown in FIG. 2 in greater detail, with emphasis on seat back assembly 214, and additionally showing optional armrest assembly 256. The seat back assembly 214 includes a seat back frame 238 and seat back cushion 240 that can support a passenger. The seat back assembly 214 is connected with the seat frame assembly 212 by way of a seat back hinge 242.

A tray table assembly 246 can be connected with the seat back frame 238, and includes a first tray table hinge 248 connecting a tray table 250 with the seat back frame. Tray table 250 can contain an imbedded magnetic element 236c. A second tray table hinge 252 can allow the tray table 250 to rotate for use. According to some embodiments, the tray table assembly 246 can be stowed in a seat back void 254 during takeoff, landing, or other maneuvers, and may be optionally deployed by a passenger for use when permitted. A third sensor 106c can be embedded within or connected with the seat back frame 238 adjacent the tray table 250 so that, when the tray table assembly 246 is stowed, the sensor 106c detects the magnetic element 236c.

An arm rest assembly 256 can also be connected with the passenger seat assembly 210 by way of, e.g., the same seat back hinge 242 or at any suitable location along the passenger seat frame 212. The arm rest assembly 256 includes an arm rest body 258 that can contain an arm rest magnetic element 236d that, when the arm rest assembly is stowed, is positioned adjacent and detectable by arm rest sensor 106d.

Figure 4B:
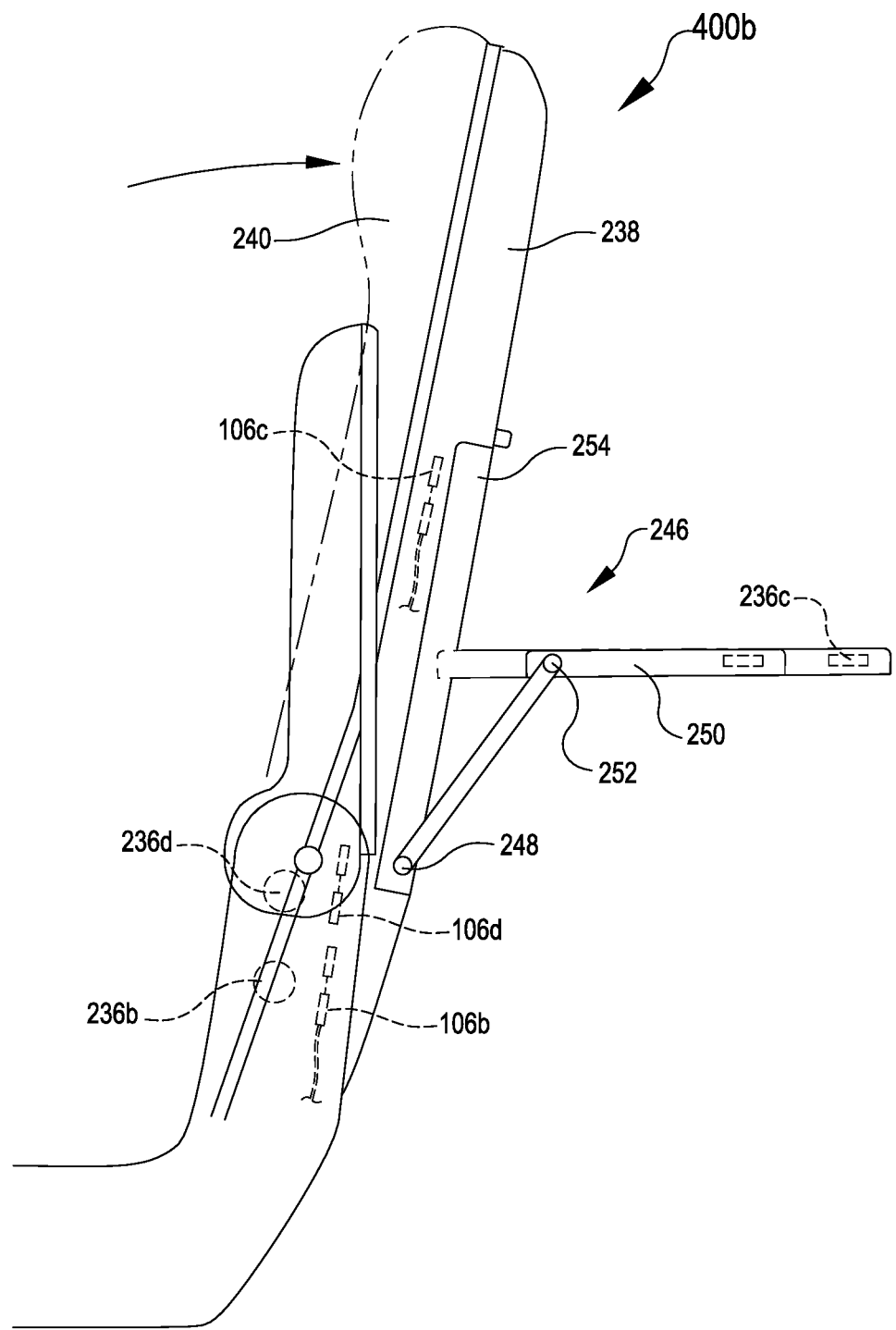
FIG. 4B shows a side view illustrating aspects of the passenger seating arrangement shown in FIG. 4A in a deployed configuration.

As shown in view 400a, the seat back assembly 214, tray table assembly 246, and arm rest assembly 256 are all positioned in a stowed configuration, wherein each magnetic element 236 is positioned proximate to an associated sensor 106. FIG. 4B, showing second side view 400b, illustrates passenger seat assembly 210 with seat back assembly 214, arm rest assembly 256, and tray table assembly 246 in a deployed or reclined position. When seat back assembly 214 is reclined at the seat back hinge 242, the seat back magnetic element 236b is translated with respect to seat back sensor 106b. Likewise, when arm rest assembly 256 is folded up, arm rest magnetic element 236d is translated with respect to arm rest sensor 106d; and when tray table assembly 246 is deployed, magnetic element 106c is no longer proximate to tray table sensor 106c. Each respective sensor 106 can communicate its status with controller 102, directly or via local controller 104, to indicate whether the associated passenger seat structure is deployed or stowed.

Various other deployable and stowable elements can be monitored by way of non-contact sensors. For example, FIGS. 5A and 5B are side views showing an example implementation of status sensors 106e in an alternative passenger seat assembly 510 having a stowed display device 568, in accordance with various embodiments.

Figure 5A:
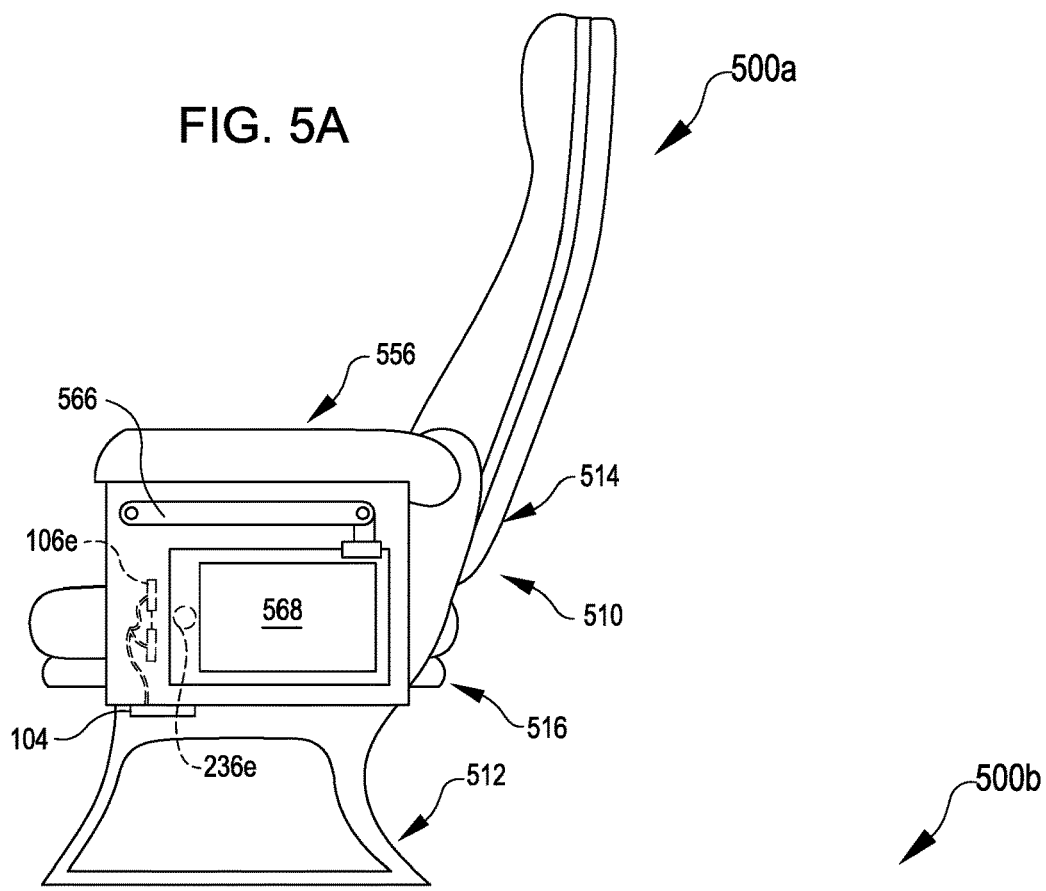
FIG. 5A shows a side view illustrating aspects of a second passenger seating arrangement having passenger seats with embedded sensors in a stowed configuration.

FIG. 5A shows passenger seat assembly 510 in a stowed configuration 500a. Passenger seat assembly 510 includes a seat frame assembly 512 that supports a seat back assembly 514, seat bottom assembly 516, and alternative embodiment of an armrest 556, in accordance with various embodiments. The armrest 556 includes a casing 562 having a hollow space 564 therein which is sized to accommodate an articulating arm 566 that supports a media device 568. Whether the media device 568 is stowed or deployed can be determined based on the status of a media device sensor 106e positioned on or within the armrest casing 562, and oriented to detect a media device magnetic element 236e when the media device is stowed.

Figure 5B:
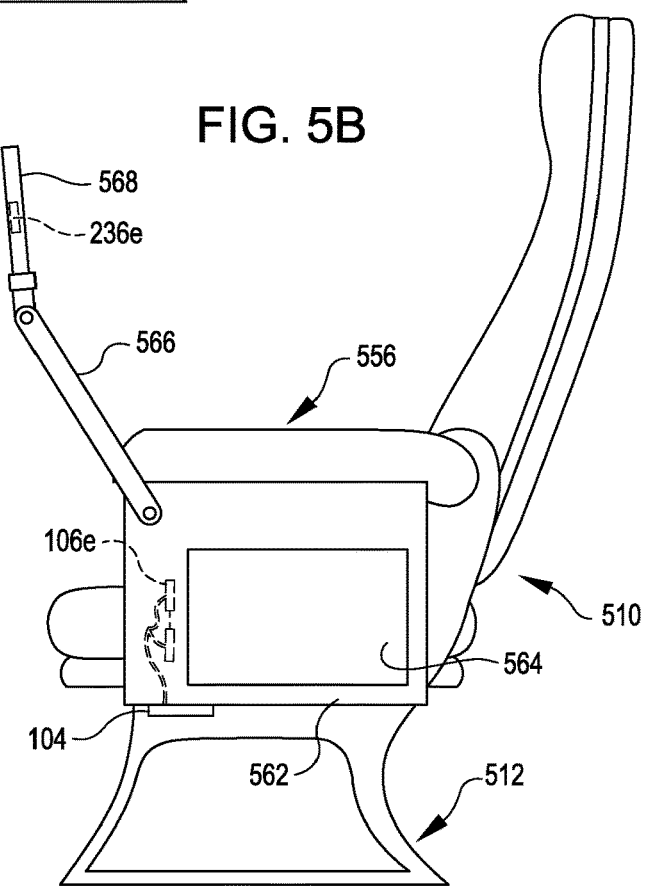
FIG. 5B shows a side view illustrating aspects of the passenger seating arrangement shown in FIG. 5A in a deployed configuration.

FIG. 5B shows passenger seat assembly 510 in a deployed configuration 500b, where the articulating arm 566 is extended out from the armrest 556 and supporting the media device 568 for viewing by a passenger. In this configuration, the magnetic element 236e is sufficiently distant from the sensor 106e that the sensor no longer detects the media device as stowed. Information from the sensor 106e indicating the deployed/stowed status of the media device 568 can be communicated with a central controller (e.g., central controller 102, FIG. 1) either directly, or via local controller 104.

Generally, structural elements described herein may be formed of materials including but not limited to aluminum, stainless steel, aramid fibers, polycarbonate, polypropylene, other metallic materials, composite materials, or other similar materials.

In the following, further examples are described to facilitate the understanding of the invention:

Example A

A passenger seat assembly, comprising: a first passenger seat structure comprising a non-contact sensor having a first state and a second state; a second passenger seat structure movably connected with respect to the first passenger seat structure such that the second passenger seat structure has a stowed configuration with respect to the first passenger seat structure and a deployed configuration with respect to the first passenger seat structure, the second passenger seat structure comprising an embedded magnetic element that interacts with the non-contact sensor such that the embedded magnetic element causes the non-contact sensor to switch between the first state and the second state when the second passenger seat structure is transitioned between the stowed configuration and the deployed configuration.

Example B

The passenger seat assembly of example A, wherein: the first passenger seat structure comprises a passenger seat frame; the second passenger seat structure comprises an articulating seat bottom pan that is slidingly connected with the passenger seat frame; and the non-contact sensor is configured to detect whether the articulating seat bottom pan has moved forward with respect to the passenger seat frame.

Example C

The passenger seat assembly of example B, further comprising: a reclinable passenger seat back mechanically linked with the articulating seat bottom pan such that, when the articulating seat bottom moves with respect to the seat frame, the reclinable passenger seat back tilts with respect to the seat frame.

Example D

The passenger seat assembly of example A, wherein: the first passenger seat structure comprises a passenger seat frame; the second passenger seat structure comprises a reclinable passenger seat back; and the non-contact sensor is configured to detect whether the reclinable passenger seat back has moved from an upright position to a reclined position.

Example E

The passenger seat assembly of example A, wherein: the first passenger seat structure comprises a passenger seat back; the second passenger seat structure comprises a deployable tray table; and the non-contact sensor is configured to detect whether the deployable tray table has moved from a stowed position to a deployed position.

Example F

The passenger seat assembly of example A, wherein: the first passenger seat structure comprises one of a passenger seat spreader, frame, or seat back; the second passenger seat structure comprises a passenger seat armrest; and the non-contact sensor is configured to detect whether the passenger seat armrest is in a folded-down position or a folded-up position.

Example G

The passenger seat assembly of example A, wherein: the first passenger seat structure comprises an electronic display container; and the second passenger seat structure comprises a deployable electronic display.

Example H

The passenger seat assembly of any of the preceding examples, wherein the non-contact sensor comprises a reed switch.

Example I

The passenger seat assembly of any of the preceding examples, wherein the non-contact sensor comprises a hall-effect sensor.

Example J

The passenger seat assembly of any of the preceding examples, wherein the embedded magnetic element comprises a permanent magnet.

Example K

The passenger seat assembly of any of the preceding examples, wherein the embedded magnetic element is contained within the second passenger seat structure such that the embedded magnetic element is inaccessible to a passenger.

Example L

The passenger seat assembly of any of any of the preceding examples, wherein: when the second passenger seat structure is in the stowed configuration, the embedded magnetic element activates the non-contact sensor via proximity with the non-contact sensor.

Example M

The passenger seat assembly of any of the preceding examples, wherein the non-contact sensor is contained within the first passenger seat structure such that the non-contact sensor is inaccessible.

Example N

A system for detecting a status of a passenger seat structure, the system comprising: a first passenger seat structure comprising a non-contact sensor having a first state and a second state; a second passenger seat structure movably connected with respect to the first passenger seat structure such that the second passenger seat structure has a stowed configuration with respect to the first passenger seat structure and a deployed configuration with respect to the first passenger seat structure, the second passenger seat structure comprising an embedded magnetic element that interacts with the non-contact sensor such that the embedded magnetic element causes the non-contact sensor to switch between the first state and the second state when the second passenger seat structure is transitioned between the stowed configuration and the deployed configuration; and a controller comprising a processor and non-volatile memory containing instructions that, when executed by the processor, cause the controller to: receive a signal from the non-contact sensor indicative of whether the non-contact sensor is in the first state or the second state; and determine, based on the signal, whether the second passenger seat structure is stowed or deployed.

Example O

The system of example N, further comprising: a plurality of first passenger seat structures comprising a plurality of non-contact sensors, including the first passenger seat structure and the non-contact sensor; and a plurality of second passenger seat structures comprising a plurality of embedded magnetic elements, including the second passenger seat structure and the embedded magnetic element, wherein the controller is further configured with executable instructions to: receive a plurality of signals from the plurality of non-contact sensors; and determine, based on the plurality of signals, whether each second passenger seat structure of the plurality of second passenger seat structures is stowed or deployed.

Example P

The system of example N or example 0, wherein the controller is further configured with instructions to generate, for presentation to a user, an indication of whether the second passenger seat structure is stowed or deployed.

Example Q

The system of any of the preceding examples, wherein: the first passenger seat structure comprises a passenger seat frame; and the second passenger seat structure comprises one of an articulating seat bottom pan that is slidingly connected with the passenger seat frame or a reclinable seat back that is rotatably connected with the passenger seat frame.

Example R

The system of any of the preceding examples, wherein: the first passenger seat structure comprises a passenger seat back; and the second passenger seat structure comprises a deployable tray table.

Example S

A method of detecting whether a passenger seat structure is stowed or deployed, the method comprising: receiving, at a controller, a signal from a non-contact sensor connected with a first passenger seat structure, wherein the signal is indicative of a proximity of a magnetic element embedded in a second passenger seat structure movably connected with respect to the first passenger seat structure; and determining, based on the signal, whether the second passenger seat structure is deployed or stowed.

Example T

The method of example S, wherein: the first passenger seat structure is one of a frame of a passenger seat or a seat back of the passenger seat; and the second passenger seat structure is one of an articulating seat pan of the passenger seat or a tray table of the passenger seat, respectively.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly, comprising:
    a first seat frame tube comprising a first non-contact sensor having a first state and a second state and positioned between a first seat spreader and a second seat spreader;
    an articulating seat bottom pan slidingly connected with the first seat frame tube such that the articulating seat bottom pan has a stowed configuration with respect to the first seat frame tube and a deployed configuration with respect to the first seat frame tube, the articulating seat bottom pan comprising a first embedded magnetic element connected to the articulating seat bottom pan below a seat bottom cushion that interacts with the first non-contact sensor such that the first embedded magnetic element causes the first non-contact sensor to switch between the first state and the second state when the articulating seat bottom pan is transitioned between the stowed configuration and the deployed configuration;
    a passenger seat back comprising a second non-contact sensor having a first state and a second state; and
    a deployable tray table movably connected with respect to the passenger seat back such that the deployable tray table has a stowed position with respect to the passenger seat back and a deployed position with respect to the passenger seat back, the deployable tray table comprising a second embedded magnetic element that interacts with the second non-contact sensor such that the second embedded magnetic element causes the second non-contact sensor to switch between the first state and the second state when the deployable tray table is transitioned between the stowed position and the deployed position.

2. The passenger seat assembly of claim 1, wherein the first non-contact sensor is positioned between a first sliding assembly and a second sliding assembly.

3. The passenger seat assembly of claim 1, further comprising:
    a reclinable passenger seat back mechanically linked with the articulating seat bottom pan such that, when the articulating seat bottom pan moves with respect to the first seat frame tube, the reclinable passenger seat back tilts with respect to a seat frame.

4. The passenger seat assembly of claim 1, further comprising a second seat frame tube comprising a third non-contact sensor having a first state and a second state and positioned between the first seat spreader and the second seat spreader, wherein the articulating seat bottom pan is slidingly connected with the second seat frame tube, the articulating seat bottom pan comprising a third embedded magnetic element connected to the articulating seat bottom pan below the seat bottom cushion that interacts with the third non-contact sensor such that the third embedded magnetic element causes the third non-contact sensor to switch between the first state and the second state when the articulating seat bottom pan is transitioned between the stowed configuration and the deployed configuration.

5. The passenger seat assembly of claim 4, wherein the first non-contact sensor and the third non-contact sensor are aligned in a forward-aft direction.

6. The passenger seat assembly of claim 4, wherein at least the first non-contact sensor and the third non-contact sensor are operably connected with a local controller, the local controller being positioned below the articulating seat bottom pan.

7. The passenger seat assembly of claim 1, wherein the first non-contact sensor comprises a reed switch.

8. The passenger seat assembly of claim 1, wherein the first non-contact sensor comprises a hall-effect sensor.

9. The passenger seat assembly of claim 1, wherein the first embedded magnetic element comprises a permanent magnet.

10. The passenger seat assembly of claim 1, wherein the first embedded magnetic element is contained within the articulating seat bottom pan such that the first embedded magnetic element is inaccessible to a passenger.

11. The passenger seat assembly of claim 1, wherein:
    when the articulating seat bottom pan is in the stowed configuration, the first embedded magnetic element activates the first non-contact sensor via proximity with the first non-contact sensor.

12. The passenger seat assembly of claim 1, wherein the second non-contact sensor is contained within the passenger seat back such that the second non-contact sensor is inaccessible.

13. A system for detecting a status of a passenger seat structure, the system comprising:
    a passenger seat spreader comprising a first non-contact sensor having a first state and a second state;
    a seat back frame movably connected with respect to the passenger seat spreader such that the seat back frame has a stowed configuration with respect to the passenger seat spreader and a deployed configuration with respect to the passenger seat spreader, the second seat back frame comprising a first embedded magnetic element that interacts with the first non-contact sensor such that the first embedded magnetic element causes the first non-contact sensor to switch between the first state and the second state when the seat back frame is transitioned between the stowed configuration and the deployed configuration;
    an electronic display container comprising a second non-contact sensor having a first state and a second state;
    a deployable electronic display movably connected with respect to the electronic display container such that the deployable electronic display has a stowed position with respect to the electronic display container and a deployed position with respect to the electronic display container, the deployable electronic display comprising a second embedded magnetic element that interacts with the second non-contact sensor such that the second embedded magnetic element causes the second non-contact sensor to switch between the first state and the second state when the deployable electronic display is transitioned between the stowed position and the deployed position; and a controller comprising a processor and non-volatile memory containing instructions that, when executed by the processor, cause the controller to:
receive a first signal from the first non-contact sensor indicative of whether the first non-contact sensor is in the first state or the second state;
receive a second signal from the second non-contact sensor indicative of whether the second non-contact sensor is in the first state or the second state; and
determine, based on the first signal and the second signal, whether the seat back frame is stowed or deployed and whether the deployable electronic display is stowed or deployed.

14. The system of claim 13, wherein the seat back frame supports a seat back cushion.

15. The system of claim 13, wherein the controller is further configured with instructions to generate, for presentation to a user, an indication of whether the seat back frame is stowed or deployed.

16. The system of claim 13, wherein the first embedded magnetic element is contained within the seat back frame such that the first embedded magnetic element is inaccessible to a passenger.

17. The system of claim 13, wherein the first non-contact sensor is contained within the passenger seat spreader such that the first non-contact sensor is inaccessible.

18. A method of detecting whether a passenger seat structure is stowed or deployed, the method comprising:
receiving, at a controller, a first signal from a first non-contact sensor connected with a first passenger seat spreader, wherein the first signal is indicative of a proximity of a first magnetic element embedded in a seat back frame movably connected with respect to the first passenger seat spreader;
determining, based on the first signal, whether the second passenger seat structure back frame is deployed or stowed;
receiving, at the controller, a second signal from a second non-contact sensor connected with a first seat frame tube and positioned between the first passenger seat spreader and a second passenger seat spreader, wherein the second signal is indicative of a proximity of a second magnetic element embedded in an articulating seat bottom pan movably connected with respect to the first seat frame tube; and
determining, based on the second signal, whether the articulating seat bottom pan is deployed or stowed.

19. The method of claim 18, wherein the controller comprises a local controller positioned below the articulating seat bottom pan.

* * * * *